March 24, 1959 W. M. MADSEN 2,878,893
DUST COLLECTOR
Filed Oct. 3, 1955 4 Sheets-Sheet 1

WALTER M. MADSEN,
INVENTOR.

BY
Attorney

March 24, 1959 — W. M. MADSEN — 2,878,893
DUST COLLECTOR
Filed Oct. 3, 1955 — 4 Sheets-Sheet 3

WALTER M. MADSEN,
INVENTOR.
BY
Attorney

United States Patent Office 2,878,893
Patented Mar. 24, 1959

2,878,893
DUST COLLECTOR

Walter M. Madsen, La Mirada, Calif.

Application October 3, 1955, Serial No. 538,160

31 Claims. (Cl. 183—80)

This invention relates to separators generally and relates more particularly to the cyclone type of separator, this application being a continuation-in-part of my application for Dust Collector, Serial No. 344,012, filed March 23, 1953, now abandoned.

In road building, an aggregate of rocks is used and it is common to use an aggregate comprising amounts of crushed rock which is run through a dryer, usually of the direct-fired counter-flow type. The dryer interior is equipped with channel lifters and as the dryer shell turns, the lifters raise the material and cascade it through the flaming hot gases. Thus curtain of material, occurring many times per minute, is subjected to intense heat and draft which results in the pouring out of huge volumes of dust from the dryer stack.

The collection of dust discharged from the dryer in the production of asphalt and rock and sand mixes is important. For one thing, the amount of dust in the aggregate may amount to as much as 10% and even 15% but generally approximates 7½–8% of the total material to be dried with production running in the neighborhood of 100 t.p.h. The dust, if lost into the atmosphere, would amount to a loss of approximately 5 t.p.h. at such a production rate. As the dust may be used in the mix, it is of considerable commercial value and well worth recovering. Moreover, in crowded areas where plants of this character frequently operate, dust discharged into the atmosphere creates a nuisance.

The dust may be collected by wet methods but this requires a great amount of water which may involve various well-known difficulties. Hence, the present dry method of dust separation is a very important one inasmuch as the more dust that can be collected by this method, the less need be collected through the wet method.

For example, recovery of from 80 to 85 percent of the dust discharged from the dryer stack would amount to 4 t.p.h. or more where the production is running in the neighborhood of 100 t.p.h. as above described. Consequently, the wet method need be used to collect only a small percentage of the dust discharged from the dryer stack, in the neighborhood of 15 to 20 percent thereof.

While the present invention is particularly useful in the foregoing connection, its utility is of wider scope and hence is not limited thereto.

It is an object of the present invention to provide an improved separator, of the cyclone type, for separating solid particles from a fluid, particularly separating dust from air.

Another object of the invention is to provide a device of this character having a body with means for precipitating dust at the lower portion of said body.

Still another object of the invention is to provide a device of this character wherein the body has a guided air track.

A further object of the invention is to provide a device of this character wherein there is a spiral flight within the body to provide such guided air track.

A still further object of the invention is to provide a device of this character where the separation is effected by centrifugal action and gravity.

Another object of the invention is to provide a device or apparatus of this character having improved precipitation means.

Still another object of the invention is to provide a device of this character wherein turbulence is eliminated or greatly minimized at the region of discharge from the body.

A further object of the invention is to provide apparatus of this character having dead air pockets or cells exteriorly of the body for eliminating or minimizing turbulence of discharged material.

A still further object of the invention is to provide apparatus of this character wherein the spiral flights include means for aiding in the separation and precipitation of dust or the like.

In many types of cyclone separators, the dust-laden air is whirled around and around a number of times within the cyclone chamber. This consumes time and it is, therefore, another object of the present invention to provide apparatus of the present character wherein the time required for separating the materials is greatly reduced.

Another object of the invention is to provide apparatus of this character having improved structural features for relatively easy assembly, replacement and repair.

Still another object of the invention is to provide apparatus of this character adapted to have a plurality of bodies or barrels which may be readily inserted and removed.

It is a further object of the invention to provide apparatus of this character that is effective in its operation.

It is still a further object of the invention to provide apparatus of this character that is simple in construction.

Another object of the invention is to provide apparatus of this character that is relatively inexpensive to manufacture.

Further objects and advantages of the invention will be brought out in the following part of the specification.

Referring to the drawings which are for illustrative purposes only.

Figures 1, 2, 3, 4:
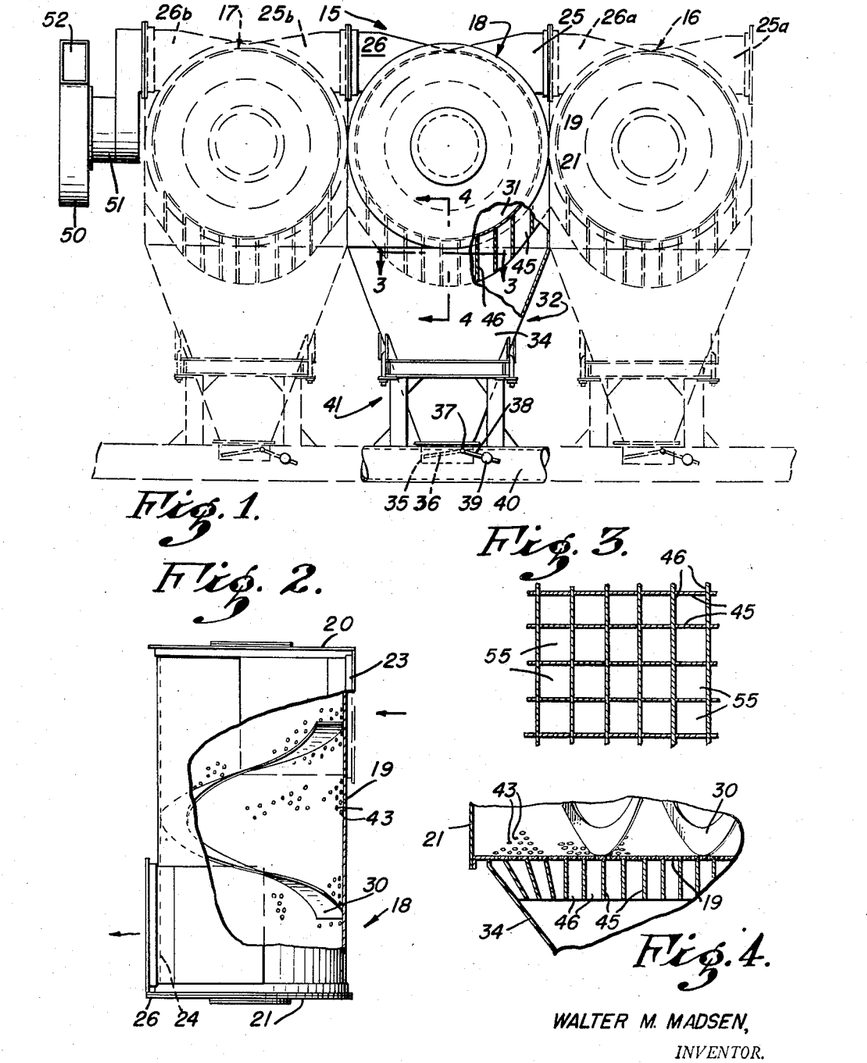
Fig. 1 is a diagrammatic view, partially in section, showing cyclonic separating apparatus embodying the present invention, there being several separating units seen from their ends.
Fig. 2 is a plan view, partially in section, of one of the units embodying the present invention.
Fig. 3 is a sectional view taken on line 3—3 of Fig. 1.
Fig. 4 is a sectional view taken on line 4—4 of Fig. 1.

Referring more particularly to the drawings, there is shown in Fig. 1, a dust separating unit embodying the present invention, said unit being indicated generally by the reference numeral 15. Apparatus of this character has particular utility in the asphalt paving industry where the aggregate is heated and, hence, there is a considerable amount of dust therein and, in order to show that a plurality of these units may be used, units indicated generally at 16 and 17 in dotted lines ahead of and behind the unit 15 are shown connected in said unit 15. Inasmuch as these various units are of the same construction, only one, unit 15, is shown in solid lines and will be hereinafter described in detail.

The apparatus includes a body, indicated generally at 18 which comprises a horizontally disposed cylindrical shell having a cylindrical outer wall 19 and end walls 20 and 21, as best shown in Fig. 2. There is an inlet opening 23 in the cylindrical wall adjacent one end thereof and an outlet opening 24 in said cylindrical wall adjacent the opposite end of said body. The inlet opening 23 has an inlet conduit 25 connected therewith and the outlet opening 24 has an outlet conduit 26 connected therewith. The inlet and outlet conduits are arranged tangentially relative to the cylindrical body and are located adjacent the upper end thereof, as best shown in Fig. 1.

There is means provided within the body 18 to prevent air entering the inlet opening 23 from passing directly to the outlet opening 24, said means comprising a spirally arranged vane 30, although it is to be understood that two or more such vanes 30 may be used. The vane is secured by any suitable means to the interior of the cylindrical wall 19.

The body 18 is supported at the upper end of an outlet bin indicated generally at 32 which comprises an upper portion 33 which is square in cross-section and a lower portion 34 which has its walls converging toward the lower end which terminates in an outlet portion 35 closed normally by a valve 36 which is pivoted at 37, adjacent one side, and is provided with an arm 38 carrying a weight 39 for maintaining said valve in the normally closed position. The discharge end 35 of the bin 32 is located in an outlet duct 40 which may be provided with a screw conveyor, not shown, for moving the dust deposited in said conduit to the desired discharge location.

Means for supporting the unit 15 comprises a suitable frame indicated generally at 41.

Referring to Figs. 1 to 4, the lower half of of the cylindrical wall 19 of body or barrel 18 is provided with perforations indicated at 43 and on the exterior of the perforated portion of the cylindrical wall 19 there is located a grid arrangement formed of corresponding crossed baffles 45 and 46 which are secured to the bin by any suitable means, such as welding or the like, and have their upper ends collectively conforming to the outside radius of the wall 19. These baffles form cells or dead air pockets in the upper end of the bin and prevent air currents which might cause the dust discharged through the perforations 43 to reenter the body 18.

Movement of the air through the units is effected by means of an air pump or fan 50 which is adapted to suck air through the units. Where there are several units, as shown in Fig. 1, the air enters the inlet 25a of the unit 16 and passes from the outlet 26a to the inlet 25 to which the outlet 26a is connected. After the air has passed through the unit 15, it is discharged from the outlet conduit 26 to the inlet conduit 25b of the unit 17. The outlet 26b of the unit 17 is connected to the inlet of the fan 50 by means of a conduit 51 and the fan is provided with a discharge opening 52.

Inasmuch as the separating action is the same in each of the units of the present apparatus, a description of the operation of one unit only will be described.

Spiral vane or flight 30 provides guide means for the air passing from the inlet 23 of the body to the outlet 24. The air enters the inlet 23 tangentially of the cylindrical wall 19 and the major movement of the air is adjacent the inner surfaces of said cylindrical wall. The air enters adjacent the top of the body and after it has made approximately a quarter of a turn therein, separation of the dust particles and the like begins and as the air passes about the perforated bottom portion of the wall 19, the dust particles and the like are forced through said perforations and into the pockets 55 formed by the baffles 45 and 46. Separating action is effected in one or two turns of the air around the interior of the body which is extremely rapid as compared with other types of cyclone separators wherein the dust-laden air generally has to whirl about within the separating chamber many times. The dust which enters the pockets 55 drops down into the bin or hopper 34 and may be discharged into the conduit 40 upon opening of the valve 36. It is to be noted that the taper of the bottom portion of the bin is sufficiently steep to promote the flow of collected dust downward to the discharged outlet and in order to prevent back flow of air through the discharge outlet 35 into the bin and into the body, the valve 36 is maintained closed during the separating action.

The present separator is extremely efficient and while some installations may require a plurality of separating units to remove the amount of dust and the like required, other installations may require but a single unit.

Figures 5, 6:
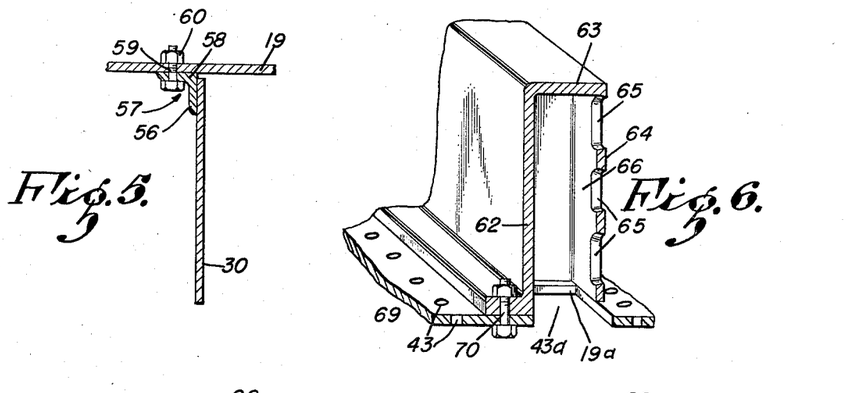
Fig. 5 is an enlarged cross-sectional view of the spiral flight.
Figs. 6 to 10, inclusive, are cross-sectional views of various alternative arrangements of the spiral flight.

In Fig. 5, there is shown a plain ribbon type vane which may be considered vane 30. One end of the vane is secured to an arm 56 of a bracket indicated generally at 57. The vane may be secured to arm 56 by means of welding or any other suitable means. Bracket 57 has an arm 58 normal to the arm 56 and said arm 58 is provided with an opening for a bolt 59 whereby the bracket is secured to the shell 19 of the body, there being a nut 60 for securing said bolt 59 in position.

The various types of vanes or flights shown in Figs. 6 to 10 respectively incorporate means for aiding the separating action. All of these include baffles having an arrangement and function which will be more particularly described later and the flights shown respectively in Figs. 6, 7, 8 and 10 are provided with chambers. Also the body wall in Fig. 6, 7, 8 and 10 have slots 43a where the wall 9 is covered by the spiral vanes instead of the perforations 43, said slots communicating with the interior of the spiral vanes or flights.

Referring to Fig. 6, the flight, shown in cross-section, is shown connected to the slotted portion of the wall 19 of the cylindrical body, said flight extending inwardly within said body. The device is generally U-shaped in cross-section with an inwardly extending spiral wall 62 from the inner end of which there is a forwardly turned portion 63 which connects the wall 62 with a wall 64 which is spaced from the wall 62 and is generally parallel thereto. Wall 64 is provided with perforations 65 and as the wall 64 is at the upstream side of the flight and the pressure of air is greatest on the upstream side thereof, the particles entrained in the air tend to enter the openings 65 and pass into the space between the walls 62 and 64. This space is divided up into a series of chambers by baffles 66 which extend substantially radially with respect to the cylindrical wall and are spaced apart from each other along the flight. Baffles 66 prevent air flowing into the chambers formed by said baffles from flowing lengthwise through the flight. In other words, these chambers provide dead air spaces so that dust which enters said chambers will precipitate downwardly so as to pass through the slots 43a in the lower wall of the cylindrical body. These chambers are at the lower portions of the spiral flights although it is to be understood that various arrangements may be used to meet the requirements of various installations. The air flowing through the body will, of course, be guided by the flight in a spiral path from the inlet to the outlet. The flight shown in Fig. 6 is provided with an outwardly extending flange 69 having openings therein for reception of securing bolts 70 whereby the flight is attached to the wall 19 of the body.

Figure 10:
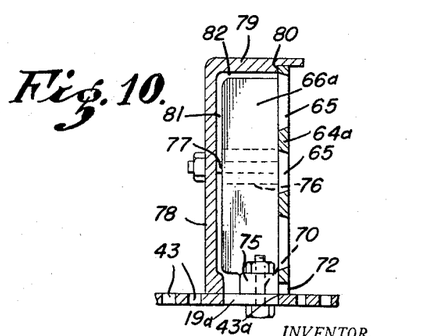

In the arrangement shown in Fig. 6, the flight may be manufactured with the parts integrally formed. Another arrangement wherein the flight parts are generally U-shaped in cross-section is shown in Fig. 10. The upstream wall 64a has the radial baffles 66a formed integrally therewith and said wall 64a is provided with spaced flanges 75 on the downstream side to provide means for attaching the flight to the wall 19. The flanges 75 are provided with openings which register with corresponding openings in the webs 19a of the wall 19 between slots 43a and bolts 70 secure the parts together. The wall 64a is also provided with rearwardly extending bosses 76 having openings therein for reception of a bolt 77 whereby the rear wall 78 of the flight may be secured to said wall 64a. The rear wall 78 also is provided with a forwardly turned flange 79 having a shoulder 80 adjacent the free edge against which the inner edge portion of the wall 64a abuts when the parts are secured together. The baffles 66a have their rear edges spaced from the wall 78 leaving a space 81 between these parts through which air may flow and the inner edges of said baffles 66a are spaced from the forwardly turned flange 79 thereby providing spaces 82 through which the air may flow.

It is to be noted that the edge of the wall 64a located adjacent the wall 19 of the body is spaced therefrom as at 72 and that air may flow along the adjacent side or face of the wall 78.

Figure 7:
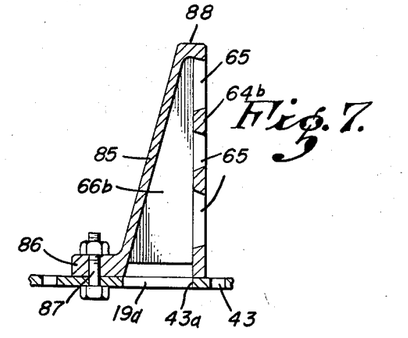

In the arrangement shown in Fig. 7, there is an integrally formed flight which is generally V-shaped in cross-section. The rear wall 85 is provided at its outer edge with a flange 86 having openings therein which register with the openings in the wall 19 for reception of bolts 87 which secure the flight to the wall 19. The wall 85 of the flight is inclined inwardly and upstream with an end portion 88 which connects said wall 85 to the wall 64b which is generally perpendicular to the wall 19. Within the space defined by the walls 85 and 64b are baffles 65b which are spaced apart and are also generally radially arranged with respect to the cylindrical body 19.

Figure 8:
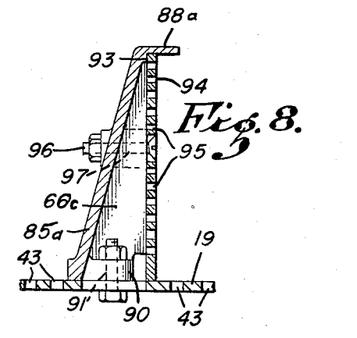

In the arrangement shown in Fig. 8, wall 85a has forwardly extending spaced lugs 90 having holes therein which register with openings in the wall 19 for reception of bolts 91 which secure the parts together. The internal baffles 66c are formed integrally with the wall 85a and the inner end portion 88a is provided with a shoulder 93 against which the inner edge of a front wall 94 abuts. This front wall is provided with perforations 95 therein through which the dust-laden air may pass into the precipitation pockets within the flight and said plate is secured to the wall 85a by means of bolts 96 received in bosses 97 arranged along the flight.

Figure 9:
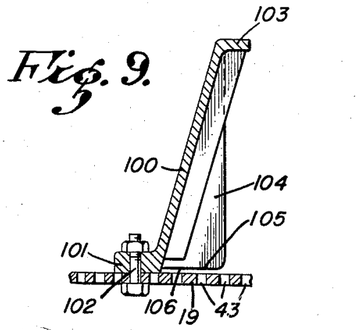

The arrangement shown in Fig. 9 comprises a wall or vane 100 having a rearwardly extending flange 101 adjacent the outer edge whereby the flight may be secured to the wall 19 by means of bolts 102. The vane 100 inclines inwardly and in the upstream direction and is provided with a flange 103 which extends upstream from the inner free edge of said vane. Radially arranged baffles 104 are spaced along the wall 100 on the upstream side thereof and are formed integrally therewith. It is to be noted that the outer edges 105 of the baffles 104 are spaced from the adjacent wall 19 and provide flow space 106 therebetween.

While the perforations 43 and/or slots 43a are shown and described as in the bottom portion of the body 18 it is to be understood that they may be also in other portions of said body where required in certain installations.

Figure 11:
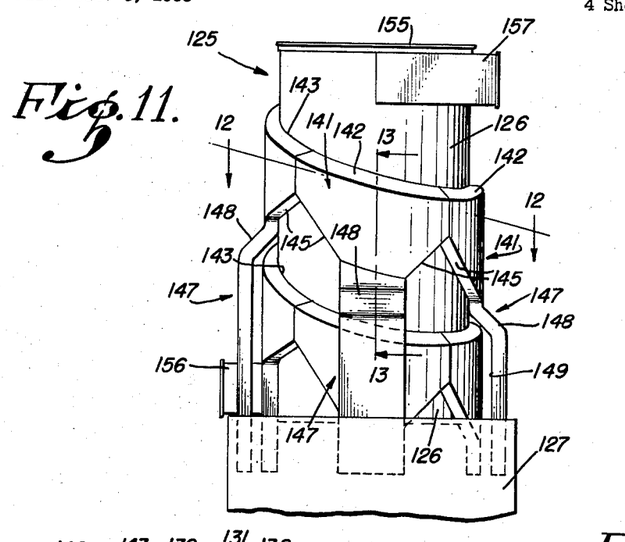
Fig. 11 is a side view of an alternative arrangement of the mechanism.
Figures 12, 13:
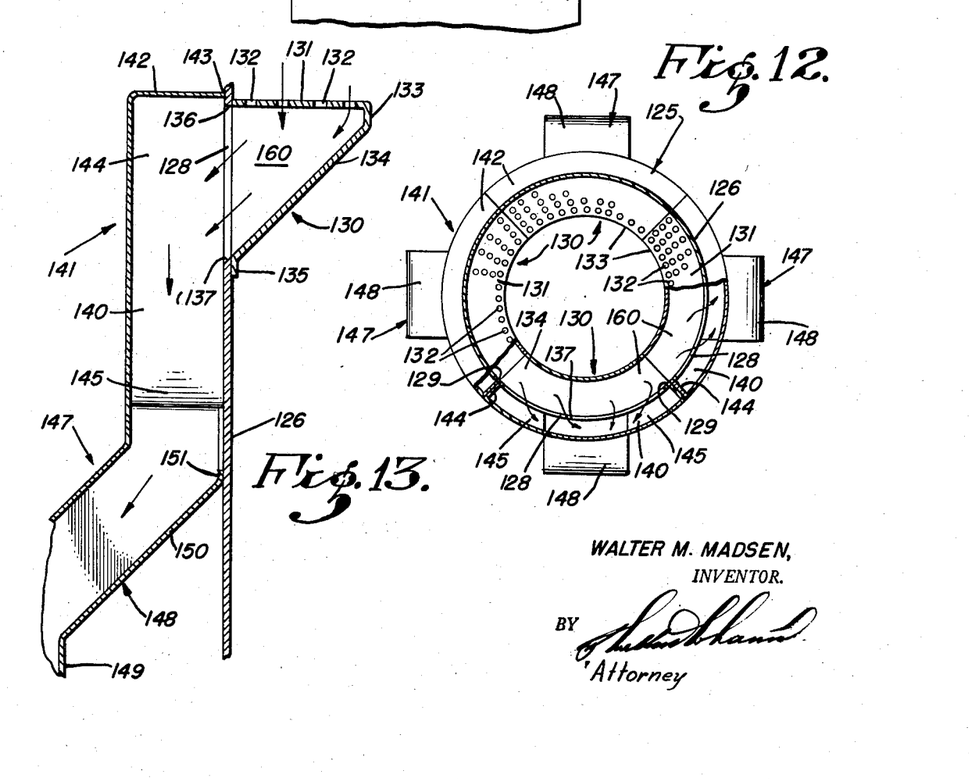
Fig. 12 is a sectional view taken on line 12—12 of Fig. 11.
Fig. 13 is a sectional view taken on line 13—13 of Fig. 11.

In the embodiment of the invention shown in Figs. 11, 12 and 13 the body is indicated at 125 and is arranged vertically. The body comprises a tubular or cylindrical wall 126 which is mounted in any suitable manner on a bin or hopper 127. There is a series of generally spirally shaped slots 128 separated by reenforcing web 129. These slots extend from the upper end downwardly to the lower end of the body 125. Within the body is a spiral flight comprising a plurality of sections indicated generally at 130. Each section 130 is provided with an upper wall 131 having a plurality of openings 132 therethrough. The width of the wall 131 is substantially less than the radius of the cylindrical body 125 and the plane of said wall is generally at right angle to the axis of the cylindrical body 125. Each section also includes a depending, generally vertical portion 133 from which is downwardly and outwardly inclined a wall 134 terminating in a depending flange 135 engageable with the inner surface of the wall 126. The flange 135 may be provided with openings, not shown, for reception of bolts or the like, also not shown, whereby the section 130 may be attached to the body wall 126. The outer edge of the wall 131 engages the inner surface of the cylindrical wall 126 and is located just above the upper edge of the respective slot 128, as best shown in Fig. 13. The lower edge 137 of the slot 128 is inclined downwardly and outwardly and is in substantially the same plane as the inner surface of the wall portion 134 so that dust sliding down said inner surface of wall 134 will not be caught at the lower edge of said slot 128.

While the sections 130 could be permanently secured to the inner wall of the body it is desirable to have these sections removable due to the fact that they are subjected to considerable wear from the abrasive action of the dust and other particles carried by the air passing through the apparatus.

Dust receiving chambers 140 are provided on the exterior of the cylindrical wall 126 by a plurality of housings, each indicated at 141. The upper wall 142 of each housing has its free edge 143 resting or abutting against the exterior of the cylindrical wall 126 and is located closely adjacent the upper edge 136 of the respective slot 128, said wall 142 being just above the upper edge of the slot 128 and inclined at the same angle as said slot. The housing 141 has vertical side walls 144 from the lower end of which walls 145 depend and extend toward each other to join the upper end of a duct, indicated generally at 147. Duct 147 has an outwardly inclined portion 148 terminating at the lower end in a substantially vertical portion 149 which extends into the bin 127. It is to be noted that the bottom wall 150 of the inclined portion 148 of said duct has its upper end 151 abutting against the exterior surface of the cylindrical wall 126.

As best shown in Fig. 11 the ducts 147 are of various length depending on the vertical spacing of the housings 141 with respect to the lower end of the body. By off-setting or outwardly inclining the portion 148 clearance is provided for the lower housings.

The housings may be secured to the body by any suitable means such as bolts or the like, not shown.

The upper end of the body is closed by a plate 155 which is attached by any suitable means such as bolts or the like, not shown. The opposite end of the body may be similarly closed.

Means for causing a flow of air through the body is attached to the outlet 156 at the lower end of said body. This means may comprise a pump or fan such as 50 in Fig. 1. The inlet for the body is shown at 157 and is arranged so that the air enters tangentially. The tangentially entering air is caused to swirl through the body and follow the spiral flights. The pressure on the front faces or upper walls 131 of the spiral flight is greater than the centrifugal pressure against the cylindrical wall 126. The solid particles in the air stream enter the openings 132 in the wall 131 and pass into the space 160 defined by the sections 130. From the chamber 160 the dust and foreign particles pass through the slots 128 into the chambers 140 and thence pass downwardly through the ducts 147 into the bin 127.

If desired a plurality of the vertically arranged separators may be connected together with the outlet 156 attached to the inlet 157 of the next succeeding unit. Where a plurality of units are connected together the fan or pump will be at the outlet end of the last unit.

Figures 14, 15, 16, 17, 18:
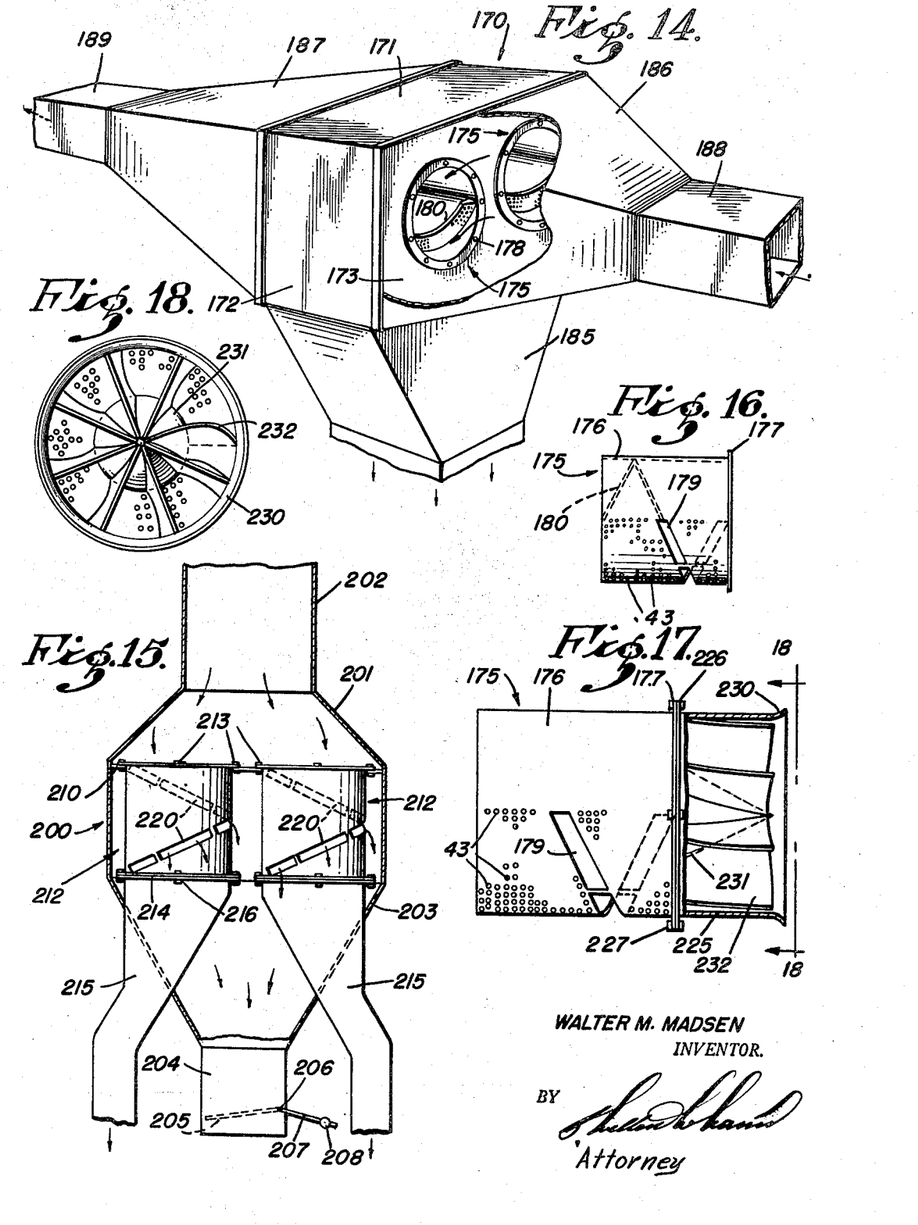
Fig. 14 is a perspective of alternative arrangement of the apparatus with portions broken away.
Fig. 15 is a sectional view of another alternative arrangement.
Fig. 16 is a side view of one of the bodies or barrels of the apparatus of Fig. 14.
Fig. 17 is a side elevation of a barrel with alternative means for initiating the spiral movement of air prior to its entrance to the body or barrel.
Fig. 18 is an end view of the latter arrangement as seen from lines 18—18 of Fig. 17.

In the arrangement shown in Fig. 14 the separator units are arranged in parallel rather than in series as shown in Fig. 1. There is a generally rectangular casing, indicated generally at 170, having an upper wall 171, side wall 172 and front and rear walls, only the front wall being shown and indicated at 173. Wall 173 is provided with a plurality of openings for reception of the cylindrical bodies of the separator units, indicated generally at 175. The opposite wall is also provided with openings which are axially aligned with the openings in the wall 173 so that the opposite ends of the units 175 are received therein.

One of the units 175 is shown in Fig. 16. This unit comprises a cylindrical wall 176 having an outwardly extending flange 177 at one end, said flange having a plurality of annularly spaced openings 178 for reception of both whereby the unit may be secured to the wall 173. The body wall 176 is provided with a spirally arranged series of slots 179. Within the body 176 a spiral flight 180 is provided and is attached so as to cooperate with the slots 179, dust removed from the air by the spiral flight 180 drops through the slots 179 and into the downwardly tapering shoot 185 secured to the bottom of the casing 170.

The ends of the casing 170 are provided with tapering outwardly extending hoods or covers 186 and 187. Hood 186 is connected with an inlet duct 188 and the hood 187 has an outlet duct 189. Duct 188 is connected with a source of dust laden air, or a source of any fluid having material therein to be removed therefrom, and duct 189 is connected to a pump or other device for drawing air through the apparatus.

Illustrated in Fig. 15 is apparatus having a plurality of separator units vertically arranged as contrasted with the horizontal arrangement of Fig. 14.

There is a housing 200 having an upwardly tapered hood 201 connected with an inlet duct 202. Attached to the lower end of the casing 200 is a downwardly tapered dust receiving section 203 to the lower end of which is attached a discharge duct 204 normally closed by a valve 205 which is carried by a shaft 206 one side thereof so that said valve is pivotally mounted. An arm 207 is attached to the shaft 206 and a weight 208 is provided on the arm 207 to provide closing force for said valve 205. When sufficient dust has collected in the duct 204 the valve 205 will automatically open to discharge said dust.

At the upper end of the casing 200 is a horizontal wall 210 having a plurality of openings for reception of the cylindrical bodies of separator units, indicated generally at 212.

The units 212 are attached to the wall 210 by any suitable means such as bolts 213. The lower end of the units 212 are provided with flanges 214 to which the enlarged upper ends of air ducts 215 are secured by means of bolts 216. Air ducts 215 pass through openings provided therefor in the section 203. Air ducts 215 are adapted to be connected to an air pump or the like and the inlet duct 202 leads from a source of fluid or air from which foreign material is to be separated.

The cylindrical wall of each separator unit 212 is provided with a series of slots 220 arranged spirally as in the cylindrical body 125 of the apparatus shown in Figs. 11, 12 and 13. The spiral separator sections 130 may be used in connection with the slots 220 of the units 212 and dust separated by these sections will be discharged from the slots 220 and into the section 203.

Various means may be employed to initiate swirling or spiral movement of air entering the separator body.

One of these means is the tangential arrangement of the air inlet. Another arrangement is shown in Fig. 17. In this arrangement there is a tubular inlet section 225 having a flange 226 for attachment to the flange 177 of the unit 175. Screws or bolts 227 may be used to connect the flanges together.

At the inlet of the tubular portion 225 the walls are flared outwardly as at 230 and within said section is a cone shaped member 231 having its apex pointed forwardly into the airstream. Member 231 forces the air outwardly into the area of the cylindrical body occupied by the spiral flight. Disposed radially about the member 231 are a plurality of helicoid vanes 232 which cause the air entering the inlet section 225 to swirl so that as it enters the body defined by the wall 176 to swirl. This initial swirling movement of the air before it reaches the spiral flight in the body improves the efficiency of the apparatus.

I claim:

1. A separator for removing solid particles from a gas, comprising: a horizontal hollow body defined by a cylindrical wall, the lower half of said cylindrical wall being perforated, said body having an inlet opening in the cylindrical wall adjacent one end thereof and an outlet opening in said cylindrical wall adjacent the opposite end thereof; means for directing dust-laden air tangentially into the horizontal body through said inlet opening; at least one spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side being perforated below a horizontal plane through said axis; spaced baffles in the lower portion of said flight between said walls, said baffles being generally radial with respect to the cylindrical body; walls defining a dust bin having a tapering lower end with an outlet at said lower end, said body being connected with said bin adjacent the upper end thereof; a plurality of cross baffles secured to the bin with their upper ends conforming to the outside curvature of the cylindrical wall of the body, said baffles forming dead air pockets exteriorly of the cylindrical body; and valve means for the bin outlet, said valve means being biased in the closing direction.

2. A separator for removing solid particles from a gas, comprising: a horizontal hollow body defined by a cylindrical wall, the lower portion of said cylindrical wall having a plurality of perforations, said body having an inlet opening in the cylindrical wall adjacent one end thereof and an outlet opening in said cylindrical wall adjacent the opposite end thereof; means for directing dust-laden air tangentially into the horizontal body through said inlet opening; a spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side and below a horizontal plane through said axis having a plurality of perforations therein; baffles in the lower portions of said flight between said walls, said baffles being generally radial with respect to the cylindrical body and spaced apart from each other; walls defining a dust bin having a tapering lower end with an outlet at said lower end, said body being connected with said bin adjacent the upper end thereof; and baffle means having the upper ends thereof conforming to the outside curvature of the cylindrical wall of the body, said baffles forming dead air pockets exteriorly of and adjacent to the cylindrical body.

3. In a separator for removing solid particles from a gas: a horizontal hollow body defined by a cylindrical wall, a lower portion of said cylindrical wall being perforated, said body having an inlet opening in the cylindrical wall adjacent one end thereof and an outlet opening in said cylindrical wall adjacent the opposite end thereof; means for directing dust-laden air tangentially into the horizontal body through said inlet opening; a spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side being perforated below a horizontal plane through said axis; baffles in the lower portion of said flight between said walls, said baffles being generally radially with respect to the cylindrical body; and baffles at the exterior side of the perforated portion of the cylindrical wall forming turbulence reducing means.

4. In a separator for removing solid particles from a fluid: a horizontal hollow body defined by a cylindrical wall, the lower portion of said cylindrical wall being perforated, said body having an inlet opening in the cylindrical wall adjacent one end thereof and an outlet opening in said cylindrical wall adjacent the opposite end thereof; means for directing dust-laden air tangentially into the horizontal body through said inlet opening; and a spiral flight on the interior of said cylindrical wall between the inlet and the outlet to form a spiral path between said inlet and outlet adjacent the interior of said cylindrical wall, said spiral flight including a pair of walls defining spiral chamber means, the wall at the inlet side being perforated below a horizontal plane through said axis; baffles in the lower portion of said flight between said walls, said baffles being generally radial with respect to the cylindrical body.

5. In a cyclone separator: a horizontal hollow body defined by a cylindrical wall, the lower portion of said cylindrical wall being perforated, said body having an inlet opening in the cylindrical wall adjacent one end thereof and an outlet opening in said cylindrical wall adjacent the opposite end thereof; means for directing dust-laden air tangentially into the horizontal body through said inlet opening; and spiral flight means on the interior of said cylindrical wall between the inlet and the outlet to form a spiral path between said inlet and outlet adjacent the interior of said cylindrical wall, said spiral flight means including a pair of walls spaced from each other longitudinally with respect to the axis of the body, the wall at the inlet side being perforated below a horizontal plane through said axis; baffles in the lower portion of said flight means between said walls, said baffles being generally radially with respect to the cylindrical body.

6. In a separator for removing solid particles from a fluid: a horizontal hollow body defined by a cylindrical wall, at least a lower portion of said cylindrical wall being perforated, said body having an inlet opening adjacent one end thereof and an outlet opening adjacent the opposite end thereof; and a spiral vane on the interior of said cylindrical wall between the inlet and the outlet; baffles at the inlet side of said vane below a horizontal plane through the axis of said cylindrical wall, said baffles being generally radially with respect to the cylindrical body and extending forwardly and substantially normal to the plane of the adjacent portion of the vane.

7. In a separator for removing solid particles from a gas: a horizontal hollow body defined by a cylindrical wall, the lower portion of said cylindrical wall being perforated, said body having an inlet opening adjacent one end thereof and an outlet opening adjacent the opposite end thereof; a spiral vane on the interior of said cylindrical wall between the inlet and the outlet; and baffles at the inlet side of said vane, said baffles extending crosswise of the vane and projecting toward the inlet of said body.

8. In a separator for removing solid particles from a fluid: a horizontal hollow body defined by a cylindrical wall, a lower portion of said cylindrical wall being perforated, said body having an inlet opening adjacent one end thereof and an outlet opening adjacent the opposite end thereof; and a spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side being perforated below a horizontal plane through said axis, and spaced baffles in the lower portion of said flight between said walls, said baffles being generally radial with respect to the cylindrical body.

9. In a separator for removing solid particles from a gas: a horizontal hollow body defined by a cylindrical wall, a lower portion of said cylindrical wall being perforated, said body having an inlet opening adjacent one end thereof and an outlet opening adjacent the opposite end thereof; and a spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side being removable and being perforated below a horizontal plane through said axis; and spaced baffles in the lower portion of said flight between said walls, said baffles being generally radial with respect to the cylindrical body.

10. In a separator for removing solid particles from a fluid: a horizontal hollow body defined by a cylindrical wall, a lower portion of said cylindrical wall being perforated, said body having an inlet opening adjacent one end thereof and an outlet opening adjacent the opposite end thereof; a spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side being perforated; and spaced baffles in the lower portion of said flight between said walls, said baffles being generally radial with respect to the cylindrical body and being spaced from the cylindrical wall.

11. In a separator for removing solid particles from a fluid: a horizontal hollow body defined by a cylindrical wall, a portion of said cylindrical wall being perforated, said body having an inlet opening adjacent one end thereof and an outlet opening adjacent the opposite end thereof; and a spiral flight on the interior of said cylindrical wall between the inlet and the outlet to form a spiral path between said inlet and outlet adjacent the interior of said cylindrical wall, said spiral flight including a pair of walls spaced from each other longitudinally with respect to the axis of the body, the wall at the inlet side being perforated below a horizontal plane through said axis; and spaced baffles between said walls, said baffles being generally radial with respect to the cylindrical body and being spaced from the spiral wall at the outlet side.

12. In a separator for removing solid particles from a fluid: a horizontal hollow body defined by a horizontal cylindrical wall, a portion of said cylindrical wall being perforated, said body having an inlet opening adjacent one end thereof and an outlet opening adjacent the opposite end thereof; and a spiral vane on the interior of said cylindrical wall between the inlet and the outlet to form a spiral path between said inlet and outlet adjacent the interior of said cylindrical wall; and baffles on said vane at the side facing said inlet opening, said baffles projecting from said vane toward the inlet of said body and being substantially radial relative to the axis of said body.

13. In a separator for removing solid particles from a fluid: a horizontal hollow body defined by a cylindrical wall, a portion of said cylindrical wall being perforated, said body having an inlet opening adjacent one end thereof and an outlet opening adjacent the opposite end thereof; and a spiral vane on the interior of said cylindrical wall between the inlet and the outlet to form a spiral path between said inlet and outlet adjacent the interior of said cylindrical wall, and spaced baffles on said vane at the side facing said inlet opening, said baffles projecting from said vane toward the inlet of said body and being substantially radial relative to the axis thereof, the edges of said baffles adjacent the cylindrical wall being spaced therefrom.

14. In apparatus of the class described: walls defining a tubular body having an inlet and an outlet spaced longitudinally therefrom; spiral flight means on the interior side of said wall means disposed between the inlet and the outlet, said spiral flight means including a pair of walls spaced relative to each other to define spiral chamber means, the wall facing the inlet being perforated and subjected to frontal pressure to cause foreign material to enter said spiral chamber; spaced baffles between said walls defining the spiral flight, said baffles extending transversely of said flight and having a length substantially as great as the width of said flight; and means connecting the space between the walls of the spiral flight with the exterior of the body.

15. In apparatus of the class described: wall means defining a tubular body having an inlet, and an outlet spaced therefrom longitudinally of said body; and spiral flight means within said tubular body and disposed between said inlet and outlet to provide a spiral path there between, said spiral flight means comprising a plurality of walls defining a spiral chamber, the wall facing the inlet having perforations therein, said body having openings connecting the exterior thereof with the space between the walls comprising the spiral flight means.

16. A hollow spiral flight for separating apparatus, including: front and rear spiral walls, the front wall having perforations therein and transverse baffles between said walls, said baffles being spaced apart longitudinally with respect to said spiral flight to define substantial compartments in said flight.

17. In a cyclone separator: a tubular body defined by cylindrical wall, a portion of said wall being perforated and said body having an inlet opening, and an outlet opening spaced therefrom longitudinally with respect to said body; and spiral flight means on the interior of said cylindrical wall between the inlet and outlet to form a spiral path between said inlet and outlet adjacent the interior of said cylindrical wall, said spiral flight means including a pair of spiral walls arranged relative to each other to define spiral chamber means, and baffles dividing at least a portion of said chamber means into compartments, the wall facing the inlet of the body being perforated.

18. In a cyclone separator: a tubular body defined by cylindrical wall, a portion of said wall being perforated and said body having an inlet opening, and an outlet opening spaced therefrom longitudinally with respect to said body; and spiral flight means on the interior of said cylindrical wall between the inlet and outlet to form a spiral path between said inlet and outlet adjacent the interior of said cylindrical wall, said spiral flight means including front and rear spiral walls defining a spiral chamber, the front wall being at the inlet side and being perforated, said perforated wall having its outer edge spaced from the adjacent portion of the cylindrical wall defining the body.

19. In a separator for removing solid particles from a fluid: a horizontal hollow body defined by a cylindrical wall, a lower portion of said cylindrical wall being perforated, said body having an inlet opening adjacent one end thereof and an outlet opening adjacent the opposite end thereof; and a spiral vane on the interior of said cylindrical wall between the inlet and the outlet, said vane having a marginal flange along the inner edge turned toward the inlet; baffles at the inlet side of said vane below a horizontal plane through the axis of said cylindrical wall, said baffles being generally radial with respect to the cylindrical body.

20. In a cyclone separator for separating heavier material from a fluid: a tubular body defined by a cylindrical wall, said body having an inlet opening, and an outlet opening spaced therefrom longitudinally with respect to said body; hollow spiral flight means on the interior of said cylindrical wall between the inlet and outlet to form a spiral path between said inlet and outlet adjacent the interior of said cylindrical wall, said spiral flight means including a pair of spiral walls spaced laterally apart relative to each other and longitudinally relative to said body, the wall at the inlet side being perforated, said cylindrical wall of said body having openings therethrough providing means through which said heavier material may be discharged from the space between said spiral walls of said spiral flight means; and laterally spaced baffles in at least a portion of said flight to divide said flight into compartments.

21. The invention defined by claim 20 wherein said openings in the cylindrical wall comprise slot means beneath said spiral flight, said slot means following substantially the same spiral as said spiral flight means and communicating with the interior thereof.

22. The invention defined by claim 20 wherein said openings in the cylindrical wall of the body comprise slot means following substantially the same spiral as the spiral flight means, said slot means extending only a portion of the length of said spiral flight means.

23. The invention defined by claim 20 wherein said opening through the cylindrical wall of the tubular body comprise slot means having substantially the same spiral as that of the spiral flight means and extending substantially the entire length of said spiral flight means.

24. In a separator for removing solid particles from a gas: a vertical hollow body defined by a cylindrical wall, said body having an inlet opening adjacent the upper end and an outlet opening adjacent the lower end; and hollow spiral flight means on the interior of said cylindrical wall between said inlet and said outlet to form a spiral path therebetween adjacent the interior of said cylindrical wall, said spiral flight means including a perforated wall substantially horizontal at a cross section and extending into said body from the wall thereof a distance substantially less than the radius of the body, and an imperforate wall inclined downwardly and outwardly from the inner edge of said perforated wall at said cross section, said cylindrical wall having slot means communicating with the interior of said spiral flight means and following the spiral thereof, the lower edge of said slot means registering with the upper surface of said imperforate wall.

25. The invention defined by claim 24, and including a plurality of housing sections secured to the exterior of said hollow body and defining chambers into which said solid particles will be deposited through said slot means; and an outlet duct for each housing and providing means for carrying away solid particles separated from said gas, ducts for upper housings being offset to clear lower housings; and receptacle means for said solid particles, said ducts being connected to said receptacle means.

26. In a cyclone separator for separating from a fluid material of a different character from said fluid: a tubular body defined by a cylindrical wall, said body having an inlet opening, and an outlet opening spaced therefrom longitudinally with respect to said body; spiral flight means on the interior of said cylindrical wall between the inlet and outlet to form a spiral path therebetween adjacent the interior of said cylindrical wall, said spiral flight means having a width less than the radius of the body so that the inner side of said spiral path is open and in communication with the longitudinally central region in said body; and means at the upstream end of the spiral path to initiate swirling of said fluid as it is introduced into said path, said means including a cone axially arranged with respect to said body and having its apex pointed upstream.

27. In a cyclone separator for separating from a fluid material of different characteristics from said fluid: a tubular body defined by a cylindrical wall, said body being open at the inlet end and having an outlet spaced longitudinally from said inlet end; spiral flight means on the interior of said cylindrical wall between the inlet and said outlet to form a spiral path between said inlet and outlet adjacent the interior surface of said cylindrical wall, said spiral flight extending inwardly from said wall a limited distance so as to leave a longitudinally extending central region of said body open; a cone shaped member axially arranged with respect to said body and having its apex facing upstream, the area of the base of said cone shaped member being substantially the same as the area of the cross section of said longitudinally extending central region in said body; and vanes disposed about said cone shaped member to initiate swirling movement of fluid adjacent the wall of said body prior to its entrance into said spiral path.

28. In a cyclone separator: a hollow body defined by a cylindrical wall, said body having an inlet opening adjacent one end thereof and an outlet opening adjacent the opposite end thereof; means, including a pair of spiral walls spaced apart longitudinally relative to the axis of said body defining a hollow spiral flight on the interior of said cylindrical wall between said inlet and outlet to form a spiral path therebetween adjacent the interior of said cylindrical wall, one of said spiral walls of said spiral flight having perforations communicating with the hollow interior of said flight and being subjected to the force of air flowing along said spiral path whereby foreign material will enter said spiral flight; and means separating the hollow flight into compartments.

29. In a cyclone separator: a hollow body defined by a cylindrical wall, said body having an inlet opening adjacent one end thereof and an outlet opening adjacent the opposite end thereof; means defining a hollow spiral flight on the interior of said cylindrical wall between said inlet and outlet to form a spiral path between said inlet and outlet adjacent the interior of said cylindrical wall, said spiral flight including front and rear spiral walls, the front wall having perforations communicating with the interior of said flight and subjected to frontal fluid pressure, and means in at least part of said hollow flight forming compartments therein.

30. In a cyclone separator for separating from a fluid, material of a different character from said fluid: a tubular body defined by a cylindrical wall, said body having an inlet opening, and an outlet opening spaced therefrom longitudinally with respect to said body; and hollow longitudinally compartmented spiral flight means on the interior of said cylindrical wall between said inlet and said outlet to form a spiral path therebetween adjacent the interior of the cylindrical wall, said spiral flight means including front and rear walls, the front wall being perforated and said compartments providing substantially dead air spaces longitudinally of the spiral flight means.

31. In a cyclone separator for separating from a fluid, material of a different character from said fluid: a tubular body defined by a cylindrical wall, said body having an inlet opening, and an outlet opening spaced therefrom longitudinally with respect to said body; hollow spiral flight means on the interior of said cylindrical wall between said inlet and said outlet to form a spiral path therebetween adjacent the interior of the cylindrical wall, said spiral flight means including a perforated front wall; and means in said hollow spiral flight means for inhibiting fluid flow lengthwise of said flight means and providing pockets of relatively calm air within said flight means.

References Cited in the file of this patent

UNITED STATES PATENTS

| | | |
|---|---|---|
| 381,639 | Pomeroy | Apr. 24, 1888 |
| 395,185 | Simpson | Dec. 25, 1888 |
| 408,074 | Bretney | July 30, 1889 |
| 948,062 | Morgan | Feb. 1, 1910 |
| 1,077,947 | Abrames et al. | Nov. 4, 1913 |
| 1,600,762 | Hawley | Sept. 21, 1926 |
| 1,735,298 | Pfeffer | Nov. 12, 1929 |
| 1,958,577 | Hirshfield | May 15, 1934 |
| 2,147,671 | Pratt | Feb. 21, 1939 |
| 2,333,961 | Sweeny | Nov. 9, 1943 |
| 2,413,324 | Holzwarth | Dec. 31, 1946 |
| 2,542,635 | Davis | Feb. 20, 1951 |

FOREIGN PATENTS

| | | |
|---|---|---|
| 150,089 | Germany | Mar. 28, 1904 |
| 424,561 | France | Mar. 16, 1911 |
| 661,079 | Germany | June 10, 1938 |
| 637,962 | Great Britain | May 31, 1950 |
| 486,070 | Italy | Oct. 27, 1953 |